INVENTOR
John W. McConnell

United States Patent Office 3,146,831
Patented Sept. 1, 1964

3,146,831
RAKE FOR MAINTENANCE OF SAND TRAPS AND PUTTING GREENS OF GOLF COURSES
John W. McConnell, 246 E. Edgehill Road, San Bernardino, Calif.
Filed Mar. 27, 1963, Ser. No. 268,244
2 Claims. (Cl. 172—21)

This invention relates to a rake particularly adapted for use in the maintenance of sand traps and greens of golf courses.

It is an object of this invention to provide a rake for use in maintaining golf courses including an inflexible reticulate head, a portion of which is adapted to penetrate the sand of a sand trap to a predetermined depth, to effect rolling and fluffing of the sand, as the rake is drawn therethrough, as opposed to pulling the sand and building up sand piles in advance of the rake head, the reticulate head removing debris and foreign matter from the sand and leaving a sand trap that is clean and level throughout.

Another object is to provide a rake of the character described, the head of which is of concavo-convex shape in cross section, with the convex side thereof being adapted to be rocked on a golf green, to aerate the latter, or impregnate it with topsoil, fertilizer, sand, etc., without damaging the greens.

Further objects are to provide a rake, as described, having a handle disposed at a predetermined angle to the rake head, to facilitate use of various portions of the rake head when it is turned from one side to the other for effecting different raking operations; to provide a rake capable of cleaning, loosening and leveling the sand trap in approximately half the time normally required with a standard rake; and to provide a rake requiring no special or intricate parts and which, by virtue of its study character, requires a minimum of effort by the user and is more durable than rakes heretofore used.

Other objects of the invention will be manifest from the following description of the present preferred form of the invention, taken in connection with the accompanying drawings, wherein.

Figure 1:
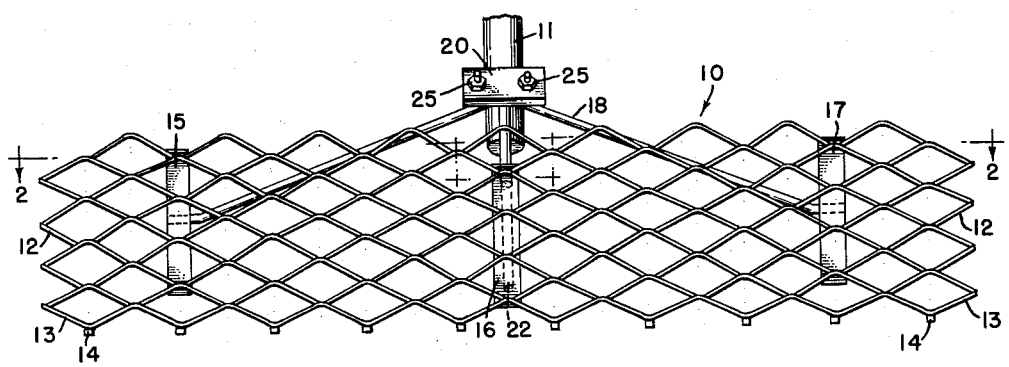
FIG. 1 is a fragmentary front elevational view of the rake of the present invention.
Figure 2:
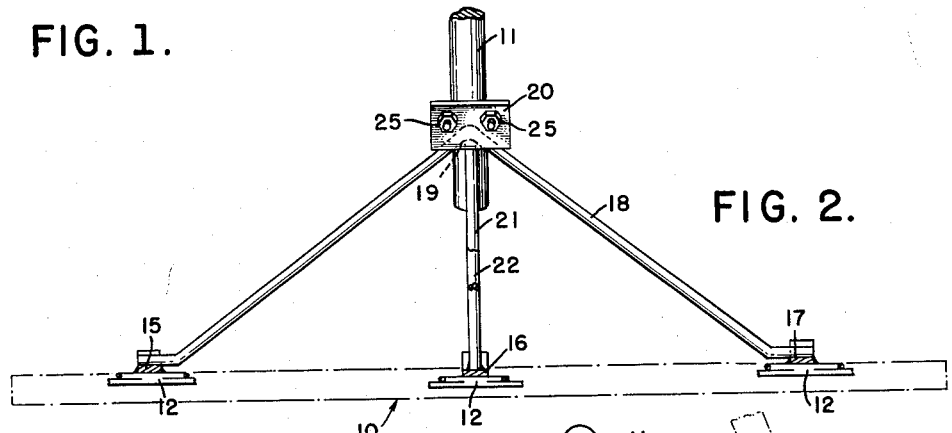
FIG. 2 is a sectional view taken along the lines 2—2 of FIG. 1, looking in the direction of the arrows.

Referring now in greater detail to the drawing, the rake of the present invention generally comprises a rake head 10, to which is attached a handle, 11.

Rake head 10 includes an inflexible reticulate, generally oblong body portion 12 of substantially concavo-convex shape, in cross section. Optimum results have been obtained with a body portion made of basket type expanded metal, rolled to shape. One edge of said concavo-convex body portion is reversely bent to provide an extension 13 which terminates in protrusions or teeth 14.

Figure 5:
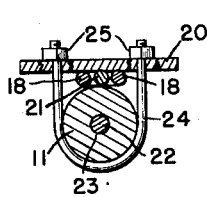
FIG. 5 is a sectional view taken along the lines 5—5 of FIG. 3, showing to advantage the manner of attaching the handle to the rake head.

A plurality of reinforcing straps 15, 16 and 17 are fixed in any suitable manner transversely of the concave face of said body portion, the intermediate portions of the straps being in spaced relation to the arc of the concave side. In connection with rake head 10, there is provided a bracing entity including a substantially V-shaped brace 18, the terminals of which are welded or secured in any other suitable manner, to straps 15 and 17. The apex of said V-shaped brace is fixed at 19 to a handle support plate 20. A second brace 21 extends from one terminal of strap 16 to support plate 20 and is also affixed thereto at point 19. Another brace 22 has one terminal thereof fixed to the terminal of strap 16 remote from brace 21. Brace 22 is angled upwardly in the direction of brace 21 with the upper terminal thereof lying in opposed spaced relation to the apex of V-shaped brace 18. Braces 18, 21 and 22 are preferably made of standard metal rods, although any suitable material may be used for this purpose. The free terminal of brace 22 is adapted to be received in a socket 23 formed in the end of handle 11. Assembly of rake head 10 and handle 11 is completed by means of a U-bolt 24 which encircles the handle at a point near its lower terminal, as shown to advantage in FIG. 5, the threaded terminals of U-bolt 24 being passed through complemental openings in handle support plate 20. U-bolt 24 is secured by nuts 25.

Figure 3:
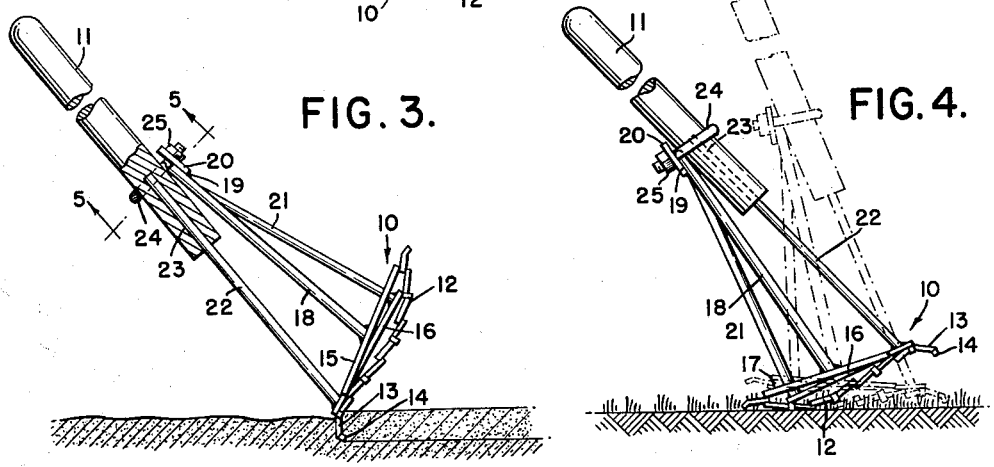
FIG. 3 is a side elevational view of the present rake, illustrating its use in a sand trap.

In actual use on a golf course, the rake of the present invention is held in the manner illustrated in FIG. 3 of the drawings, for leveling and cleaning a sand trap, extension 13 and teeth 14 penetrating the sand to a depth of one or two inches, with the extension positioned substantially vertical, with respect to the ground. As the rake is moved, it loosens the sand and, by virtue of the expanded metal construction thereof, the sand is rolled, rather than pulled by the rake head, with the result that the sand is fluffed up and leveled, rather than piled in advance of the rake. Debris and other foreign matter is caught by the expanded metal during the loosening and leveling operation.

Figure 4:
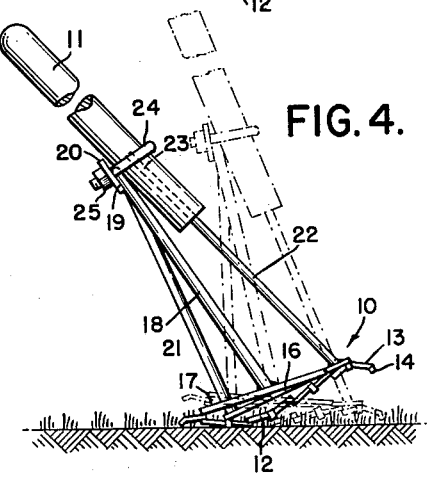
FIG. 4 is a side elevational view of the present rake, illustrating its use on a golf green, and showing to advantage the manner of rocking the rake.

In FIG. 4, there is illustrated the manner of using the present rake for aerating greens and impregnating the latter with topsoil, fertilizer, sand, etc. The rake head is turned over from the position of use in the sand trap, so that the convex portion of the expanded metal engages the green. As will be seen from a comparison of FIGS. 3 and 4, by virtue of the angular relationship of handle 11, with respect to rake head 10, handle 11 extends upwardly at approximately the same angle for the two different raking operations, thereby facilitating manipulation of the rake by the user. In order to aerate or impregnate the greens with any desired material, it is only necessary that the rake head be rocked forward and backward, as illustrated in FIG. 4, thereby permitting engagement of the convex arc of body portion with the green, the operation being carried out without damage to the green.

With the rake of the present invention, it has been found that the sand of a sand trap can be cleaned, loosened and leveled in approximately half the time normally required with rakes heretofore employed. Furthermore, the present rake requires no special or intricate parts, but comprises readily available materials which may be easily assembled. By virtue of the inflexible, sturdy character of the rake, a minimum of effort is required in performing the various raking operations and the rake is more durable than hakes heretofore used.

In actual use, it has been found that a rake head approximately four and a half inches high, thirty inches wide, on a standard length handle, is effective for optimum maintenance of sand traps and greens. If desired, a smaller rake of the same type, may be used for individual sand traps by the players.

While the rake of the present invention has been shown and described as being adapted for use on a golf course, it is of course to be understood that it may also be used in other environments, where it is desired to perform similar functions.

While I have herein shown and described a preferred embodiment of my invention, it is nevertheless to be understood that various changes may be made therein, without departing from the spirit and scope of the claims hereto appended.

What is claimed is:

1. A rake for maintenance of sand traps and putting greens of golf courses, including a head comprising an inflexible, reticulate, generally oblong body portion of substantially concavo-convex shape in cross-section, one edge of said concavo-convex body portion being reversely bent to provide an extension terminating in teeth adapted to penetrate and loosen the sand of a sand trap, the sand being rolled by virtue of the reticulate construction of the body portion, to fluff and level the sand, and a handle fixed to said head, said handle being disposed at such an angle to said head that the terminal teeth of said body portion are substantially vertical to the ground, when the rake is held in position for use in a sand trap, the rake being turned over to effect engagement of the convex portion of the reticulate, oblong body portion with the green, the handle extending upwardly at approximately the same angle for the two different raking operations, thereby facilitating manipulation of the rake by the user.

2. The rake of claim 1, with the addition of a bracing entity for said head including a plurality of spaced straps extending transversely of, and fixed to, the concave face of said body portion, a substantially V-shaped brace, the terminals of said brace being secured to two of said straps, the apex of said V-shaped brace being fixed to said handle, a brace intermediate said V-shaped brace secured at one end to a third strap and at the other end to the handle and a brace extending from the lower end of said handle, and in axial alignment therewith, the lower end of which brace is fixed to one of said straps at a point adjacent the terminal teeth of said body portion.

References Cited in the file of this patent

UNITED STATES PATENTS

| 1,127,233 | Hadford | Feb. 2, 1915 |
| 1,286,779 | Rhomberg | Dec. 3, 1918 |
| 1,381,569 | Linhoff | June 14, 1921 |
| 1,569,421 | Coelho | Jan. 12, 1926 |
| 2,134,942 | Harkness | Nov. 1, 1938 |
| 2,141,533 | Hubbell | Dec. 27, 1938 |
| 2,887,170 | Fenicchia | May 19, 1959 |
| 3,083,652 | Brettrager et al. | Apr. 2, 1963 |

FOREIGN PATENTS

| 678,624 | Great Britain | Sept. 3, 1952 |